(12) United States Patent  
Admassu

(10) Patent No.: US 7,063,008 B2  
(45) Date of Patent: Jun. 20, 2006

(54) INJERA MANUFACTURING SYSTEM

(75) Inventor: Wundeh Admassu, Moscow, ID (US)

(73) Assignee: Zelfiwu, Inc., Moscow, ID (US)

( * ) Notice: Subject to any disclaimer, the term of this patent is extended or adjusted under 35 U.S.C. 154(b) by 426 days.

(21) Appl. No.: 10/298,262

(22) Filed: Nov. 14, 2002

(65) Prior Publication Data

US 2004/0096556 A1    May 20, 2004

(51) Int. Cl.
*A21B 5/00* (2006.01)

(52) U.S. Cl. .................... 99/353; 99/386; 99/443 C

(58) Field of Classification Search ............. 99/353, 99/385–386, 393, 443 C; 426/496, 502, 426/523

See application file for complete search history.

(56) References Cited

U.S. PATENT DOCUMENTS

| 3,917,856 A | * | 11/1975 | Wong et al. .................. 426/94 |
| 3,926,105 A | * | 12/1975 | Warning, Sr. ................. 99/423 |
| 4,280,402 A | | 7/1981 | Featherstone ................. 99/355 |
| 4,321,858 A | * | 3/1982 | Williams ..................... 99/353 |
| 4,583,451 A | * | 4/1986 | Kanagy ....................... 99/423 |
| 4,735,811 A | | 4/1988 | Skarra et al. ................ 426/549 |
| 4,803,086 A | | 2/1989 | Hedenberg .................... 426/87 |
| 5,077,072 A | | 12/1991 | Sieradzki .................... 426/523 |
| 5,088,391 A | * | 2/1992 | Anderson ..................... 99/423 |
| 5,298,273 A | * | 3/1994 | Ito ........................... 426/549 |
| 6,132,786 A | | 10/2000 | Poulos et al. ................ 426/326 |
| 2003/0143309 A1 | * | 7/2003 | Kindie et al. ................ 426/496 |

* cited by examiner

*Primary Examiner*—Drew Becker  
(74) *Attorney, Agent, or Firm*—Wells St.John P.S.

(57) ABSTRACT

A manufacturing system for the manufacture of an Ethiopian staple food referred to as Injera and sometimes Enjera, including an apparatus and a method or process. The system includes a depositing stage, a spreading stage, a flash heating stage, and one or more finishing stages. The one or more finishing stages may including baking, cooling or otherwise applying heat for a desired finishing result.

5 Claims, 3 Drawing Sheets

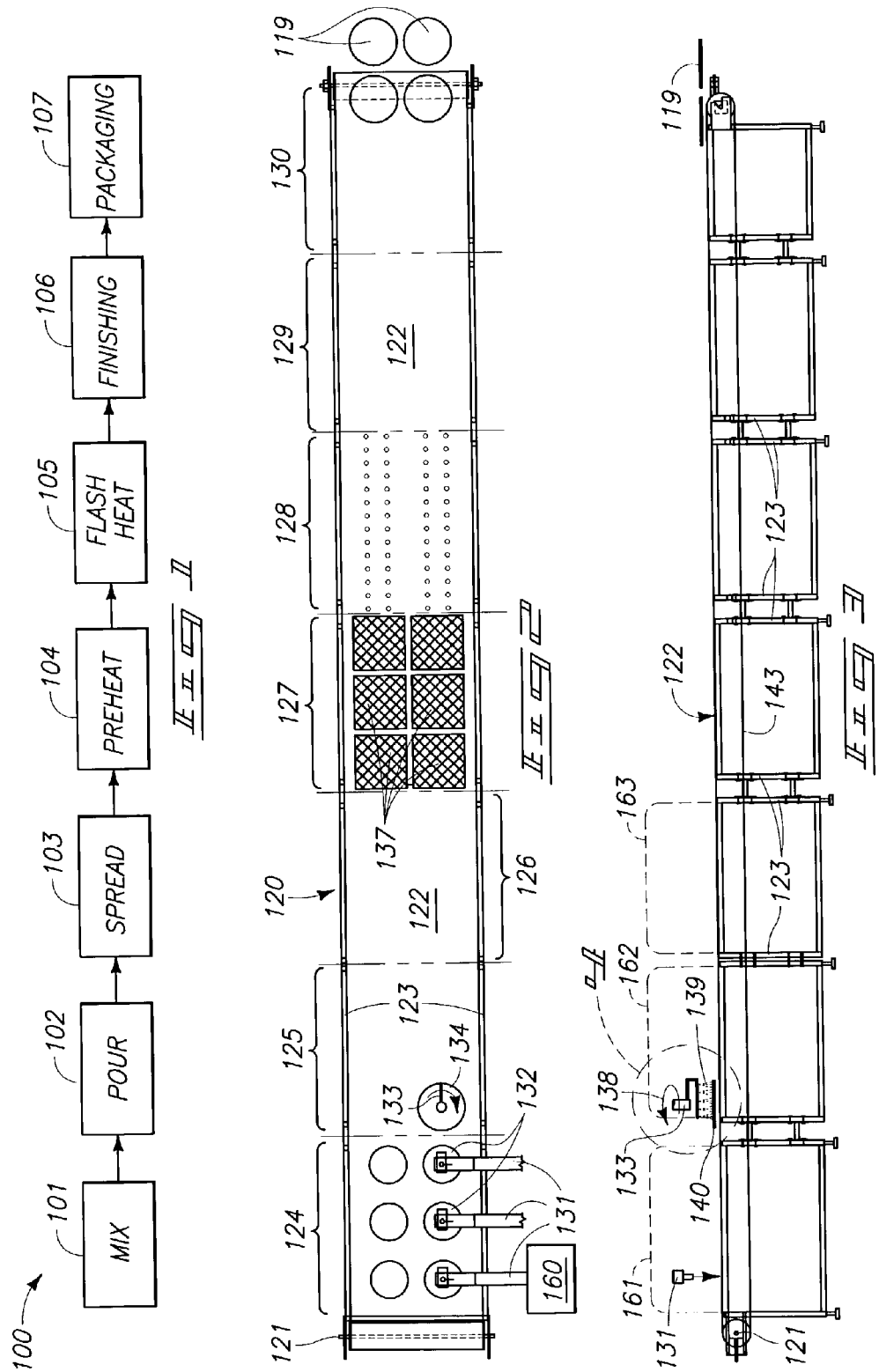

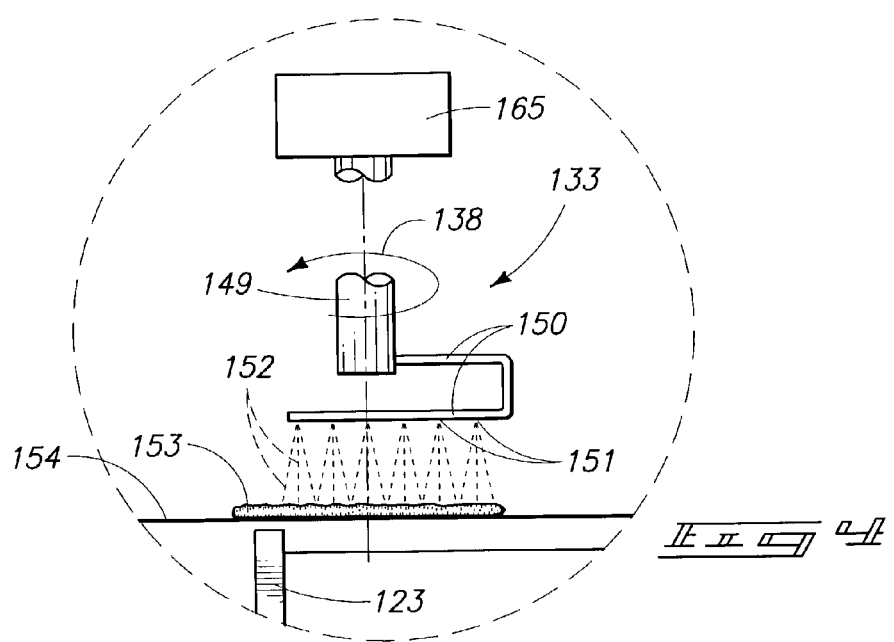
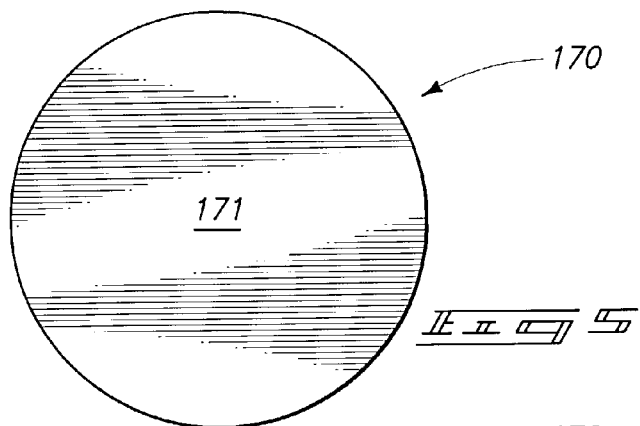
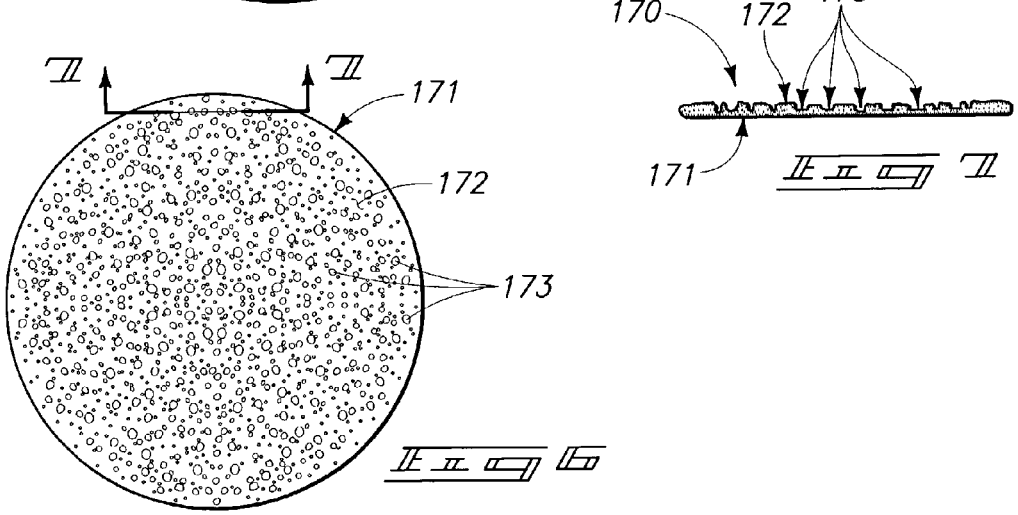

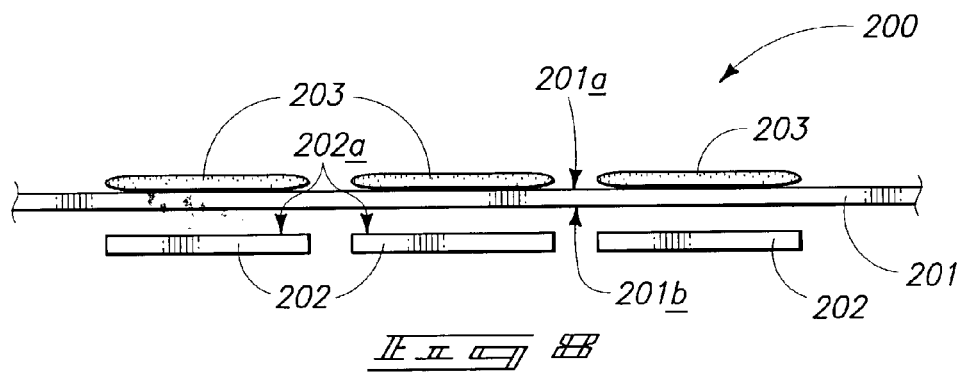
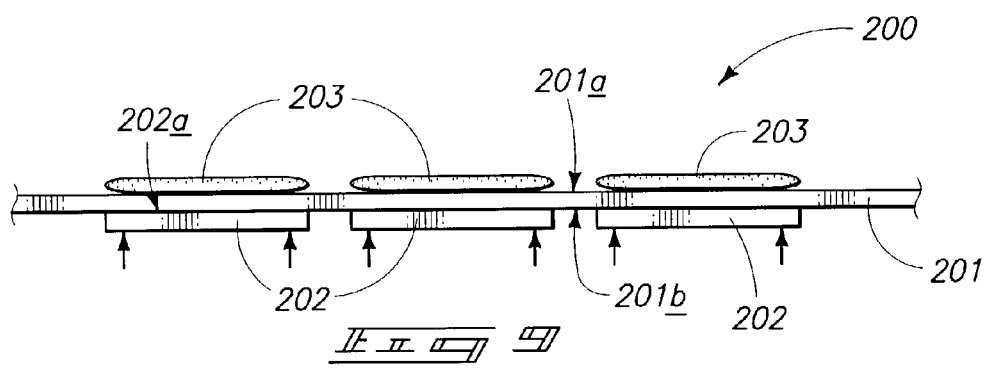
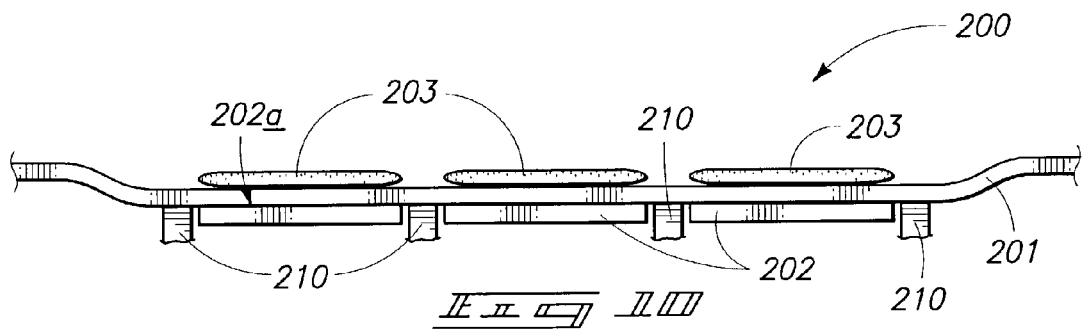
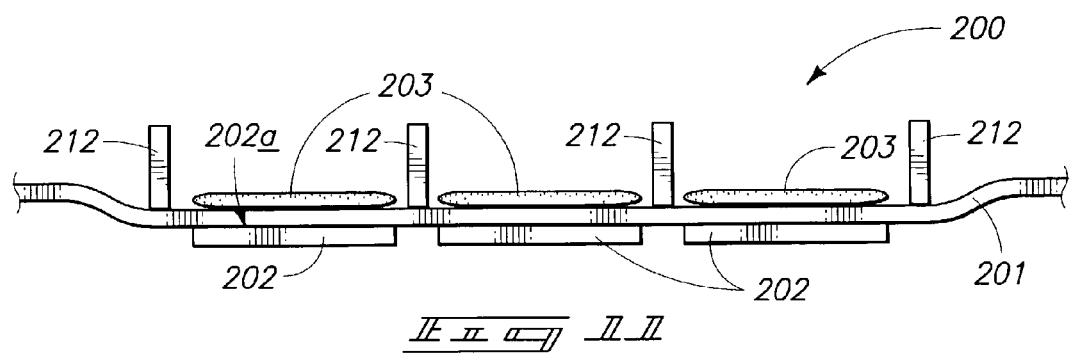

INJERA MANUFACTURING SYSTEM

CROSS REFERENCE TO RELATED APPLICATION

There are no related applications.

TECHNICAL FIELD

This invention pertains to a manufacturing system for the manufacture of an Ethiopian staple food referred to as Injera and sometimes Enjera, including an apparatus and a method or process.

BACKGROUND OF THE INVENTION

Injera, also sometimes spelled enjera, is a spongy flat bread with a distinctive taste and texture. Injera is a grain product which is predominantly eaten as a staple food item in Ethiopia. Injera is similar to what we consider to be bread and it is made from a grain generally found in Ethiopia, namely "teff", which is a smaller grain.

There are multiple things that must be met in order to make this distinctive tasting and textured injera. Injera generally requires a batter mixture that is viscous enough (200–1500 "cp" or centipoise) to retain leavening gasses while cooking, but the batter must also be thin enough so as to result in a finished injera which is one centimeter or less in thickness. The spongy texture of the injera is preferably radially uniform and voids (sometimes referred to as "eyes") generally should increase in diameter from the bottom to the top. The injera is preferably soft and flexible and has a unique brownish color. Some or all of these multiple requirements have heretofore prevented the successful automation of the injera production process.

Injera has traditionally been cooked on a very hot clay or stone oven and is normally patterned into a generally round and flat shape or configuration, much like a tortilla or a pancake. A cover may be placed over the batter or cooking injera to assist in the shaping and cooking of the injera.

There are certain attributes and traits of injera that Ethiopians and others are accustomed to experiencing when they consume the injera. The texture of the injera may be important to many consumers, and it generally has a first side which more resembles the surface of a tortilla, whereas the second side is generally covered with craters, holes or "eyes" as they are sometimes referred to. This is generally shown and described relative to some of the figures below.

More recently injera has been cooked on electrical frying type pans or electric skillets, again one at a time.

It is desirable to provide a way to cook injera on a more mass basis instead of one at a time, to achieve a mass production which results in injera that is just like the injera the consumer is used to eating, i.e. which meets most or all of the requirements set forth above.

It is therefore an object of this invention to provide an injera manufacturing system and machine which produces multiple injera pieces at the same time, to achieve production on a commercial basis, while still providing a final product which meets the expectations of the consumer.

BRIEF DESCRIPTION OF THE DRAWINGS

Preferred embodiments of the invention are described below with reference to the following accompanying drawings.

FIG. 1 is a block diagram of one embodiment of steps and components which may be part of an aspect of this invention;

FIG. 2 is a top schematic view of a conveyor line embodiment of the invention;

FIG. 3 is a side schematic view of the embodiment of the invention shown in FIG. 2;

FIG. 4 is detail 4 from FIG. 3, and illustrates an aspect of the batter spreader of the invention;

FIG. 5 is a bottom view of a depiction of an injera piece, which would typically be the downward side during the evaporation or flash stage;

FIG. 6 is a top view of a depiction of an injera piece, which would typically be the upward side during the evaporation or flash stage, as shown by the "eyes";

FIG. 7 is section 7—7 from FIG. 6;

FIG. 8 is an elevation schematic view of the conveyor with injera pieces positioned or indexed in the flash evaporation stage, illustrating the conveyor spaced apart from the flash heaters;

FIG. 9 is an elevation schematic view of an embodiment of the invention wherein the conveyor with injera pieces is positioned or indexed in the flash evaporation stage, and illustrating flash heaters raised up into contact with the conveyor;

FIG. 10 is an elevation schematic view of the conveyor with injera pieces positioned or indexed in the flash evaporation stage, illustrating the conveyor drawn down upon the flash heaters by a vacuum system; and FIG. 11 is an elevation schematic view of the conveyor with injera pieces positioned or indexed in the flash evaporation stage, illustrating the conveyor forced on to the flash heaters by mechanical arms.

DETAILED DESCRIPTION OF THE PREFERRED EMBODIMENTS

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

Although the term "injera" is used throughout to describe the food product which is the subject of this invention, it may also be spelled "enjera". The underlying product is well known to those in the Ethiopian community, and to those familiar with it, and it will not therefore be described in great detail. There may be numerous recipes and variations of recipes which are used for injera, any one of which may be used in this invention.

The term articulating conveyor as used herein, is to be construed broadly to include conveyors which move incrementally to locations. For instance, four separate batter deposits may be made on the conveyor, at which time all four are moved to the next stage at the same time, as opposed to a slow continual moving conveyor. Those four batter deposits would then simultaneously be subjected to spreading, and then to the flash heating, and so forth.

The term or phrase injera eyes as used herein, refers to the craters, holes or eyes as they may be referred to herein. These eyes generally appear in one side of the injera pieces or injera disks.

FIG. 1 is a block diagram of one embodiment of steps and components which may be part of an aspect of this invention. FIG. 1 generally shows the following steps which may be followed as part of the practice of aspects of this invention.

The first step 101 is the mixing, combining and/or blending of the ingredients used in the particular recipe. In this step, the flour from Ethiopian grain Teff is mixed with water to a consistency of a little thinner than a pancake mix so that it flows freely when poured on a cooking surface. The batter is then allowed to ferment, typically for a few days, before it is ready to be cooked. This process is preferably accomplished at about twenty five degrees Centigrade to facilitate the desired fermentation. In some situations, other flours such as barley, corn and/or wheat are added in order to vary the taste of the end product. It is preferable to achieve a batter viscosity of approximately two hundred to fifteen hundred (200 to 1500 Cp) for the system disclosed herein, although the invention is not limited to any particular batter viscosity.

The batter is similar in some ways to sour dough batter in that it may be stored or preserved in lots. It should be noted that a food grade yeast may be added to the batter in order to better facilitate the fermentation process, which may improve the taste. Some situations in which this may be utilized are when the raw ingredients do not come from the same lot.

The batter as desirably fermented is then transferred to a feed container or tank where it is mixed utilizing a mixer. The batter tends to separate or be in suspension and the mixer provides a more uniform batter for deposit on the conveyor, as described below.

The second step 102 is pouring, placing or depositing the batter on the cooking surface, which in this embodiment is a conveyor belt (preferably with a non-stick or coated surface). In this step the batter is drawn from the feed tank or container, and a positive displacement pump is utilized to meter or deposit the predetermined amount of batter on the conveyor surface. A piston based depositor is used to place or deposit the specific desired amount of batter on the conveyor or machine belt.

In a commercial machine, there will be multiple deposits made on a section of a conveyor, and the entire section of the conveyor (which includes a group or plurality of injera thereon) will preferably then be indexed or articulated from one step or stage to the next. While the invention is not limited to this, it is preferable from a final product perspective versus gradually or continually moving the conveyor and injera through the steps or stages. Furthermore, the indexing allows the various stages to be accomplished while the conveyor is stationary instead of moving. The indexing may be easily accomplished by known programmable controllers, which would also be used to activate the various tasks or functions performed at each stage, as set forth more fully below.

The group of injera batters deposited on the section of conveyor is then moved, articulated or indexed over to the next step or stage, which is the spreading of the injera to the desired thickness and width or diameter. Injera is preferably generally circular, but can be any one of a number of shapes within the contemplation of this invention. However, the injera is preferably no more than one centimeter in thickness, and it is also preferable that this thickness be relatively uniform.

The third step is spreading the batter to the approximate desired thickness and size. It is preferable to use an air-based spreader which utilizes a plurality of air streams imposed on the batter to cause it to spread to the desired diameter or outer boundaries, and to achieve the approximate desired thickness for this stage of the process. Utilizing air allows this stage to be accomplished without the necessity of contacting the batter and potentially creating inconsistencies. While air is preferred, there are a number of other or different contact ways to spread the batter within the contemplation of this invention, with no one in particular being required to practice the invention.

The spread injera batter is then preferably indexed to the next step or stage in the process, which is the fourth step 104, an optional step, of preheating or further warming the batter above the mixing and/or pouring temperature. This step is not required to practice this invention, but may be utilized to achieve the desired finished product. This may be achieved by subjecting the batter to room temperature for instance, or by applying some heat to elevate the temperature (or achieve other results) of the batter before it is indexed to the next stage. Once the batter has been pre-heated, or prepared (if that option is chosen), it along with any other batters in that section of conveyor, is indexed to the next stage.

The fifth step 105 is one in which a higher source of heat is imposed on the batter while it is on the cooking surface, to cause a portion of the moisture in the batter to flash or evaporate. This stage is the one in which the holes or eyes are initially created and it generally involves the quick introduction of heat, preferably at about three hundred and fifty degrees Fahrenheit to the batter, and then the removal of the batter from this stage by indexing it to the next stage. There are numerous different temperatures and amounts of heats, and durations, which may be introduced at this stage, but it is preferable to utilize heat at three hundred and fifty degrees Fahrenheit for approximately fifteen seconds. This stage is also referred to as the "eye formation" stage due to the creation of the holes or eyes from the flashing or evaporation of some of the moisture in the batter.

This step or stage may be accomplished in any one of a number of different ways. For instance, a heater may be located below the conveyor belt and the conveyor belt may be drawn down to or near the heater, to apply the heat to the batter in that section of the conveyor. In this embodiment, the conveyor may be drawn down by a vacuum system applied to the conveyor belt. The conveyor belt, which also includes the cooking surface, would need to have sufficient flexibility or play to allow a vacuum to draw or pull it downward to the heater. Vacuum systems are known in the art and will not therefore be described in further detail.

In this vacuum embodiment, once the particular section of the conveyor belt is moved to the cooking or eye formation stage, the vacuum pumps may be energized or activated by a signal from a programmable controller, to draw the conveyor belt or cooking surface to the heater. Once a predetermined time has elapsed, the controller signals to the vacuum pump to shut off and then the indexed movement of the conveyor belt is re-commenced and that group of injera is moved to the next step or stage.

Another embodiment for this stage of the process or part of the machine, is the movement of the heaters up to or near the bottom of the conveyor belt on which the batter is being cooked. This may be accomplished in any one of a number of different mechanical ways.

Another embodiment may utilize mechanical arms moved downward on the conveyor belt to push it downward to or near the heater. These mechanical arms may be rotated downward or simply moved downward by known mechanical systems, which will not be described in further detail.

In yet another embodiment the heater is above the conveyor belt and is preferably moved to a closer or adjacent location over the injera, to cause the flashing.

It should also be kept in mind that while the movement of the heater relative to the conveyor belt may be preferred, it may not be necessary to practice this invention, but instead the timing of the indexing of the conveyor belt with the batter group, combined with the amount of the heat introduced, may alone be utilized to cause the eye formation or flashing.

The next stage, potentially the sixth step 106, is referred to as the finishing or baking stage, and is where the final moisture content, color and texture are achieved. This stage may be accomplished in one or more stages which may occur at the same or at different temperatures. The finishing step, which bakes, finishes and/or cools the injera, is preferably accomplished by introducing a desired amount of heat to the injera. Preferably, this stage is approximately sixteen (16) seconds and heat at two hundred ninety five (295) degrees Fahrenheit is applied to the injera in the first baking stage, and approximately fourteen (14) to sixteen (16) seconds and heat at two hundred forty five to two hundred fifty five degrees Fahrenheit is applied to the injera in the second baking or finishing stage.

It is also preferable in the baking or finishing stage(s) to control the humidity of the air to which the injera is exposed, which can be accomplished in any one of a number of different ways. For instance, the humidity is preferably maintained at ninety (90) to one hundred (100) percent in the first baking stage, and at sixty-five (65) to seventy-five (75) percent in the second baking or finishing stage. The measurement and control of the humidity levels in the baking chambers may be accomplished by any one of a number of different ways, all well known by those of ordinary skill in the art.

The last or seventh step 107 is the removal of the injera from the conveyor belt and either the stacking or the packaging the injera in a convenient or desirable way.

FIG. 2 is a top schematic view of a conveyor system embodiment 120 of the invention, showing the various stages and/or components of an embodiment of the invention. FIG. 2 illustrates conveyor belt 122, conveyor axis 121 at a first end of the conveyor, a batter pouring or depositing stage 124, a spreading stage 125, a possible pre-heat or preparation stage 126, a flash heating stage 127, a first finishing or bake stage 128, a second finishing or bake stage 129 and stage 130, which may be a third finishing or bake stage or a removal/packaging stage. Injera 119 is being removed and/or is removed at stage 130.

FIG. 2 illustrates deposited injera batter 132 on the conveyor 122 in stage 124, defining a deposited diameter. As stated above, it is preferable in some embodiments of this invention to accomplish each stage while the conveyor 122 is stationary, and then to quickly move, index or articulate the conveyor to the next stage so that all injera are poured, heated, flashed, etc. at the same time, before all are moved at once to the next stage. In FIG. 2, there are six injera batter deposits 132 shown in stage 124, which have just been deposited by injera depositors 131 (three of which are not shown). The injera batter deposits shown in stage 124 are of a certain diameter, which in this embodiment, is a lesser diameter than the diameter of the injera in stage 125 after it has been spread.

FIG. 2 further illustrates injera deposit apparatus 160, shown representatively in FIG. 2, which may include one or more containers, pumps and delivery apertures. There are many ways known in the art to deliver or deposit the injera batter on the conveyor 122, with no one in particular being required, and with no further detail required for those of ordinary skill in the art.

In the evaporative or flash heater stage 127, one or more heaters are utilized to apply a short term, higher heat to the injera batter to cause moisture in the batter to evaporate or flash, thereby creating the craters, holes or "eyes" on a first side of the injera (as more fully shown and described below). The heaters 137 may be separate heaters positioned to separately provide heat to injera pieces on the conveyor at predetermined locations, or there may be fewer heaters applying heat to a greater number of injera (such as one large heater), to accomplish the heating.

It should further be noted that while FIG. 2 show a conveyor line with no hoods or housings over the various stages, some or all of the stages may include hoods or housings for one or more reasons. Reasons may vary depending on the specific embodiment of the invention, but may include humidity control, protection of the injera and other elements from the general environment, temperature control, and others. Since hoods are so well known in the art, they will not be shown or described in further detail.

It will also be appreciated by those of ordinary skill in the art that each of these steps or stages may be accomplished without a conveyor, but instead with the equipment such as the depositors, the spreaders, the flash heater(s) etc., being alternately positioned to deal with or effect the injera while the injera sits stationary. However, for simplicity and other reasons, it is preferred to utilize separate physical locations for some or all of the stages described herein.

FIG. 3 is a side schematic view of the embodiment of the invention shown in FIG. 2, showing conveyor belt 122, conveyor axis 121, the return conveyor 143, conveyor framework 123, injera depositor 131, injera spreader 133 rotating in direction 138, imposing air 139 on injera batter 140 to cause the relatively uniform spreading of the injera batter to a desired thickness and diameter or outer perimeter size. FIG. 3 also shows optional hoods 161, 162 and 163, which may be utilized in some or all of the stages, depending on the specific design of the system and the environment.

FIG. 4 is detail 4 from FIG. 3, and illustrates an aspect of the injera batter spreader 133 of the invention. While these figures illustrate an embodiment which includes an injera spreader utilizing air or air pressure to accomplish the spreading, other ways may be utilized within embodiments of this invention. For instance there may be mechanical rollers and spatula styles which actually come in contact with the injera batter, although ways which do not contact the injera batter are preferred.

It is preferable for the spreader to have a flow rate of approximately eight to twelve cubic feet per minute per spreader. The velocity is five to seven feet per second and the rotation rate is around fifty-five to sixty-five revolutions per minute. The arm is positioned about one-eighth to one-half of an inch above the batter surface. The depositor piston preferably has a variable stoke allowing the volume to be set between twelve and twenty ounces to make different sizes of injera. The depositor is positioned about four inches above the belt.

FIG. 4 illustrates an embodiment utilizing air as the spreading force, showing spreader apparatus 149 which rotates as shown by arrow 138, thereby causing the rotation of air conduit 150. Air conduit 150 includes one or more air apertures 151, which may be a plurality of distinct holes through which the air may flow, or it may include one continuous slit type of aperture, all within the contemplation of this invention. The force of the air 152 reduces the thickness of the injera batter and increases its diameter. The desired flow volume and velocity of air flow and the distribution thereof will depend on several factors, such as the time the injera batter spends at this stage, the viscosity of the injera batter 153, the ingredients of the injera batter, and others, which are or may be design choices.

FIG. 4 further illustrates injera batter 153 on conveyor 154, and a portion of conveyor framework 123 from FIG. 3. Spreader apparatus 165 may be any one of a number of devices, motors, or other ways or means, to rotate the air conduit 150 to achieve the desired spread diameter (or outer perimeter) and thickness of the injera batter, with no one in particular being required to practice this invention. Furthermore, apparatuses to perform the rotation of the spreader are generally known to those of ordinary skill in the art, and will not therefore be described in any further detail.

FIG. 5 is a bottom view of a depiction of an injera piece 170, which would typically be the downward side 171 during the manufacture or cooking thereof.

FIG. 6 is a top view of a depiction of the injera piece shown in FIG. 5, with an outer boundary or edge 171, and showing what would typically be the upward or top side 172 during the evaporation or flash stage. The numerous "eyes" 173 are visible on this side of the injera piece.

FIG. 7 is section 7—7 from FIG. 6, and illustrates injera piece 170, bottom side 171, top side 172, and craters, holes or eyes 173.

FIG. 8 through FIG. 11 show a schematic view of examples of different embodiments for applying the evaporative or flash heat to the injera batter, also referred to as the eye stage. It is preferred to impose a relatively high heat to the injera to cause moisture or water in the batter to flash evaporate, thereby creating the holes referred to as "eyes".

FIG. 8 is an elevation schematic view of an embodiment of a flash heat system 200 which may be utilized in this invention, showing conveyor 201 with a top side 201a and a bottom side 201b. Injera pieces 203 are positioned or indexed in the flash evaporation stage on the top side 201a of the conveyor belt 201. In this embodiment of the invention, heaters 202 are located below the conveyor belt 201.

FIG. 9 is an elevation schematic view of an embodiment of a flash heat system 200 which may be utilized in this invention, showing conveyor 201 with a top side 201a and a bottom side 201b. Injera pieces 203 are positioned or indexed in the flash evaporation stage on the top side 201a of the conveyor belt 201. In this embodiment of the invention, heaters 202 are located below the conveyor belt 201 and are raised upward to a position adjacent to or in contact with the bottom side 201b of the conveyor belt 201 to apply the desired heat. It is preferred that the heat be relatively uniformly applied across the injera.

FIG. 10 is an elevation schematic view of an embodiment of a flash heat system 200 which may be utilized in this invention, showing conveyor 201. Injera pieces 203 are positioned or indexed in the flash evaporation stage on the top side of the conveyor belt 201. In this embodiment of the invention, heaters 202 are located below the conveyor belt 201 and the conveyor belt 201 is lowered into contact with the heaters 202 by a vacuum system 210. The vacuum system 210 may be activated by a programmable controller used to control and index the movement of the conveyor, or by one of any number of other ways, all within the contemplation of this invention.

In this case, there are numerous known vacuum systems which may be utilized in this invention, and since vacuum systems are well known to those of ordinary skill in the art, they will not be described in further detail herein.

FIG. 11 is an elevation schematic view of an embodiment of a flash heat system 200 which may be utilized in this invention, showing conveyor 201. Injera pieces 203 are positioned or indexed in the flash evaporation stage on the top side of the conveyor belt 201. In this embodiment of the invention, heaters 202 are located below the conveyor belt 201 and mechanical arms 212 are utilized to move the conveyor 201 downward to a position adjacent to or in contact with the heaters 202.

It will also be noted that the heaters or source of heat for the flash evaporation stage may be located in locations other than below the conveyor belt 201, such as above the conveyor belt 201. In such cases, the heaters may be lowered to a position just above the injera on the conveyor belt 201, or the belt may be raised to a position just below the heaters, in a manner similar to that described above for the other embodiments.

It should also be noted that while it may be preferred to utilized a conveyor belt in which the top side of the conveyor belt is utilized as the cooking surface (and preferably includes a non-stick type of surface finish), this is not required by all embodiments of this invention. An intermediate cooking surface or layer may be interposed between the injera and the conveyor belt, all within the contemplation of this invention. Therefore when it is referred to herein that the injera is on the conveyor belt or on the top surface of the conveyor belt, i.e. the conveyor surface, that means directly and/or indirectly.

As will be appreciated by those of reasonable skill in the art, there are numerous embodiments to this invention, and variations of elements and components which may be used, all within the scope of this invention.

One embodiment of this invention, for example, is an injera cooking system comprising: a conveyor system with a conveyor surface; an injera batter deposit stage which includes a source of injera batter and an injera batter delivery aperture disposed to deposit injera batter on the conveyor surface; an injera batter spreader stage disposed to receive deposited injera batter on the conveyor surface, and which includes a spreader which spreads the injera batter to a desired thickness and outer perimeter; a flash heat stage disposed to receive spread injera batter on the conveyor surface from the spreader stage, the flash heat stage including a flash heater which applies sufficient heat to the injera batter to cause moisture in the injera batter to flash evaporate; and a finishing stage disposed to receive injera on the conveyor surface from the flash heat stage, the finishing stage including a heater disposed to apply heat to the injera batter.

There may be further or more specific systems from the foregoing embodiments, such as further wherein the sufficient heat applied to the injera batter is approximately three hundred fifty degrees for fifteen seconds; wherein the applying sufficient heat to the injera batter further comprises providing a heater near the conveyor surface; and moving the conveyor surface and the heater closer to one another to apply the sufficient heat to flash evaporate the injera.

In a further embodiment, an injera cooking system may be further provided wherein the flash heater is initially disposed is a first position near the conveyor surface, and further wherein the flash heater and the conveyor surface are configured to be moved closer together to increase the application of sufficient heat. Although movement is not required to practice this invention, this may be accomplished by moving one, the other or both together.

In another embodiment of the forenamed system the spreader may be provided comprising: an air conduit with at least one air aperture disposed to impart air on the injera batter on the conveyor surface. In this further embodiment, the air conduit may be rotated while imparting air on the injera batter.

It will also be appreciated that there are method or process embodiments of this invention, for example a method for the continuous manufacture of injera, comprising the following: providing injera batter to a conveyor surface, the injera batter including an amount of batter moisture; moving the conveyor to position the injera batter at a spreading stage; spreading the injera batter on the conveyor to a desired thickness, resulting in an injera piece; moving the conveyor to position the injera piece at a flash evaporation stage; applying sufficient heat to the injera piece to flash evaporate a portion of the batter moisture, thereby creating injera eyes in the injera piece; moving the conveyor to position the injera piece at a finishing stage; and applying sufficient heat to the injera piece to finish cooking the injera piece.

There may be further or more specific methods from the foregoing embodiments, such as further wherein the sufficient heat applied to the injera batter is approximately three hundred fifty degrees for fifteen seconds; wherein the applying sufficient heat to the injera batter further comprises providing a heater near the conveyor surface; and moving the conveyor surface and the heater closer to one another to apply the sufficient heat to flash evaporate the injera.

There may also be further embodiments which provide a method for the continuous manufacture of injera in which the spreading of the injera batter further comprises: providing an air conduit with at least one air aperture disposed to impart air on the injera batter on the conveyor surface; wherein the imparted air spreads the injera batter to the desired thickness. A further embodiment of this may be wherein the air conduit is rotated while imparting air on the injera batter.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. An injera cooking system, comprising:
   a conveyor system with a conveyor surface;
   an injera batter deposit stage which includes a source of injera batter and an injera batter delivery aperture disposed to deposit injera batter on the conveyor surface;
   an injera batter spreader stage disposed to receive deposited injera batter on the conveyor surface, and which includes a spreader which spreads the injera batter to a desired thickness and wherein the spreader comprises an air conduit with at least one air aperture disposed to impart air on the injera batter on the conveyor surface;
   a flash heat stage disposed to receive spread injera batter on the conveyor surface from the spreader stage, the flash heat stage including a flash heater which applies sufficient heat to the injera batter to cause moisture in the injera batter to flash evaporate; and
   a finishing stage disposed to receive injera on the conveyor surface from the flash heat stage, the finishing stage including a heater disposed to apply heat to the injera batter.

2. An injera cooking system as recited in claim 1, and further wherein the sufficient heat applied to the injera batter is approximately three hundred fifty degrees Fahrenheit for fifteen seconds.

3. An injera cooking system as recited in claim 1, and further wherein the flash heater is initially disposed in a first position near the conveyor surface, and further wherein the flash heater and the conveyor surface are configured to be moved closer together to increase the application of sufficient heat.

4. An injera cooking system as recited in claim 1, and wherein the conveyor system moves the conveyor surface through the flash heat stage utilizing an articulated movement.

5. An injera cooking system as recited in claim 1, and further wherein the air conduit is rotated while imparting air on the injera batter.

* * * * *